May 13, 1969 D. V. BROCKWAY 3,444,398

THYRISTOR SWITCH UTILIZING DIODES TO IMPROVE RECOVERY TIME

Filed May 10, 1966

INVENTOR
D.V. BROCKWAY
BY
Walter M. Kiel
ATTORNEY

United States Patent Office 3,444,398
Patented May 13, 1969

3,444,398

THYRISTOR SWITCH UTILIZING DIODES TO IMPROVE RECOVERY TIME

Dennis V. Brockway, Rockaway, N.J., assignor to Bell Telephone Laboratories, Incorporated, Murray Hill and Berkeley Heights, N.J., a corporation of New York Filed May 10, 1966, Ser. No. 549,030
Int. Cl. H03k *3/26*
U.S. Cl. 307—305 15 Claims This invention relates to switch circuits and more particularly to an improved switching circuit employing semiconductor switching devices which are capable of operating at high speeds in high power circuits.

Semiconductor switches of the prior art have used a variety of semiconductor devices. The semiconductor device most commonly used for this purpose is the four-layer PNPN triode device presently known in the art as a silicon controlled rectifier or a thyristor. As is well known, these devices are of the three terminal type and have properties somewhat analogous to the gas-filled thyratron and, like the thyraton, remains conductive once it is switched on until a turn-off mechanism is operated. Although the speed with which the thyristor may operate is inherently much greater than that of which the thyratron is capable, some modern applications require that these speeds be considerably increased over those for which even the thyristor is inherently capable. The use of thyristors, particularly in high voltage series strings, has been hampered by two fundamental and interrelated problems. The first of these problems relates to the dynamic breakdown characteristic of these devices, also known as their rate effect or their dv/dt effect. The second problem relates to the minority carrier storage effect on the ability of these devices to quickly regain their forward blocking characteristic after forward conduction.

The first problem relating to the dynamic breakdown characteristic arises when an initially deenergized device is subjected to a sufficiently fast rate of change of forward anode to cathode voltage. This gives rise to a displacement current through the space charge or the depletion layer capacitance of the device to falsely trigger it into conduction. The second problem relating to the minority carrier storage effect arises by reason of a stored charge developed when the device has been in forward conduction. This charge must be essentially eliminated before the device can regain its forward blocking characteristic. In order to increase the switching speed of these devices, it is necessary that not only their dynamic breakdown capability be considerably increased but the time required to restore their forward blocking properties must also be materially reduced. There have been several prior attempts to improve these properties in a practical way.

Particular reference may be made to an article by Richard A. Stasior, entitled "How to Suppress Rate Effect in PNPN Devices" which appeared in Electronics for Jan. 10, 1964 pages 30 through 33. FIG. 5(A) of this article discloses one proposal for improving the recovery time and suppressing the rate effect in a PNPN thyristor device. This proposal involves the addition of a fourth terminal to the thyristor, this terminal being connected to the second layer of the four-layer device and is denoted the "anode gate" terminal. During the recovery period, current flowing through a resistor in series with this anode gate terminal accelerates the recovery of the middle junction of the thyristor. While this method can be made effective in a high speed switching circuit it does have some disadvantages. In order to obtain a significant improvement, the series resistor must be comparable in size to that of the load resistor. The resulting disadvantage is a loss in efficiency because the series resistor will dissipate about as much energy as does the useful load. Another disadvantage is that the thyristor is required to handle a current about twice that of the useful load current.

It is an object of this invention to reduce the time required to restore the forward blocking capability of a thyristor and also to improve its dynamic breakdown capability.

The foregoing object is achieved by this invention which comprises a thyristor switch circuit having at least one four-terminal thyristor with a conventional reverse current turn-off circuit means. Both the turn-off time and the rate effect (*dv/dt*) capabilities are improved by connecting one diode between the thyristor cathode and gate terminals, a second diode between the gate and anode terminals and a third diode between the cathode and the anode gate terminals. The reverse recovery time of the thyristor middle junction should be less than that of the first diode and greater than that of the second and third diodes.

The invention may be better understood by referring to the accompanying drawings, in which:

FIGS. 1 and 2 are illustrative of some prior art circuits useful in describing some of the basic principles of this invention;

FIG. 3 discloses a simple embodiment of this invention;

Figure 1:
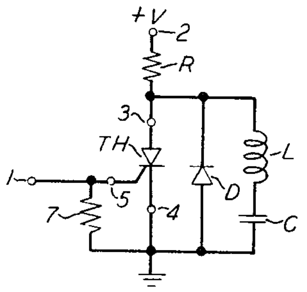
FIG. 1 PRIOR ART

FIG. 1 discloses a conventional thyristor switch circuit of the prior art comprising a thyristor TH having an anode terminal 3, a gate terminal 5 and a cathode terminal 4. The resonant turn-off circuit comprising an inductor L and a capacitor C is connected in series across the anode and cathode terminals 3 and 4, respectively. Diode D is also connected across the anode and cathode terminals and a source of direct voltage V is connected to terminal 2 to which is also connected a load resistor R, the other end of which is connected to the thyristor anode terminal 3. The cathode terminal 4 is connected to ground to which the negative terminal of the direct voltage supply is also connected. As is well known, a trigger pulse current applied to the trigger terminal 1 will develop a voltage across resistor 7, this voltage being impressed between the gate terminal 5 and the cathode terminal 4 of the thyristor. This will initiate current in the thyristor which, once initiated, will continue through a path from the direct voltage source connected to terminal 2, the load resistor R, the anode and cathode path through the thyristor and back to the grounded side of the source. Prior to the initiation of this current through the thyristor, capacitor C of the turn-off circuit is charged to the potential of the direct voltage source V. As soon as the thyristor is rendered conductive, a ringing current starts through inductor L, thyristor TH and capacitor C, the first half cycle of this current flowing in the forward direction through the thyristor. During the second half cycle of this ringing current, current will start to flow in the reverse direction through the thyristor until it starts to open at which instant the diode D begins conduction so that the remainder of this half cycle of current flows through the diode D. This automatically turns the thyristor off, leaving some residual charge of proper polarity on capacitor C which returns to an initial charge state by current from the direct voltage source V through the load resistor R and inductor L. The circuit now awaits the arrival of another trigger pulse at terminal 1 after which the cycle of operations just described repeats.

Figure 2:
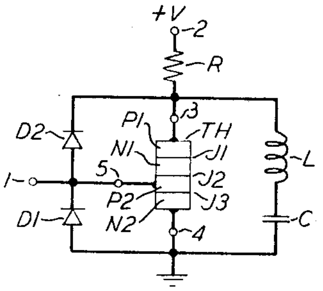
FIG. 2 PRIOR ART

FIG. 2 discloses a simple embodiment of a prior art switch circuit disclosed and claimed in the copending patent application of Messrs. W. B. Harris, Richard P. Massey and F. J. Zgebura, Ser. No. 537,544, filed Mar. 25, 1966, now Patent No. 3,404,293 and assigned to the same assignee as the present application. In this figure, the thyristor TH is shown with a different symbolic configuration but represents the same kind of device shown in FIG. 1. As shown in FIG. 2, the device comprises four layers having regions P1, N1, P2 and N2, respectively, these layers being contiguous with junctions J1, J2 and J3 between them. As in FIG. 1, the cathode terminal 4 is connected to ground, the anode terminal 3 is connected to a positive source of direct voltage V through a load resistor R and a resonant turn-off circuit comprising inductor L and capacitor C is connected across the anode and cathode terminals 3 and 4, respectively. Instead of the single diode shown in FIG. 1, two diodes D1 and D2 are connected in series across the anode and cathode terminals and their junction is joined to the gate terminal 5 and to the trigger terminal 1. As described in the copending application, it is required that diode D1 have a reverse recovery time longer than the reverse recovery time of the middle junction J2 of the thyristor, while diode D2 is required to have a reverse recovery time less than that of junction J2. The operation of the circuit of FIG. 2 may be very briefly described by first considering the circuit conditions before the trigger pulse is received at trigger terminal 1.

At this time the thyristor is not conducting and capacitor C is charged to essentially the same potential as the direct voltage source connected to terminal 2. The operation of the circuit after the trigger pulse is applied is substantially the same as that already described for FIG. 1 up to the point where reverse current begins to flow through the thyristor during the second half cycle of ringing current. It is evident that this will be a reverse current for junctions J1 and J3 but a forward current for junction J2. Initially this reverse current flows through the thyristor because diode D1 is momentarily reverse biased by the charge stored in junction J3 and diode D2 is biased below its threshold voltage by the opposed charges in junctions J1 and J2. The reverse ringing current first reduces the charge density in junction J3, thereby causing this junction to open so that current increases in diode D1 until it is carrying all of the reverse current. The reverse current now continues to flow through diode D1 and junctions J1 and J2 until the charge existing in junction J1 is reduced to zero, thereby reducing the current flowing through junctions J1 and J2 toward zero while the current through diode D2 correspondingly increases to the limit of the reverse current. Since the middle junction J2 had been forward biased, the existing charge density in this junction is not zero and it begins to recover by recombination. Diode D2, having a more rapid reverse recovery time than the middle junction J2, will recover first so that a forward current being reapplied to the device will constitute a reverse current for the middle junction and will equal the difference between the load current and the ringing network current. Gate triggering of the thyristor is prevented by preventing the sum of the alphas of the equivalent transistors comprising the thyristor from equalling or exceeding unity. This is achieved by designing diode D1 to recover more slowly than the middle junction J2.

From the above description, it will be evident that junction J1 is forced to recover by reason of a forward current flowing through junction J2, thereby increasing the storage effect in junction J2. If this can be prevented, recovery of this junction can be speeded. This is accomplished by employing a four-terminal thyristor and an additional diode in accordance with the principles of this invention.

Figure 3:
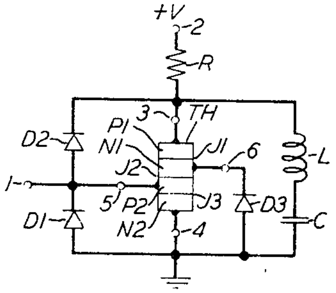

A simple embodiment of the present invention is disclosed in FIG. 3 which shows a four-layer thyristor TH having an accessible terminal connected to each layer. The anode terminal 3 is connected to the first layer defined by the region P1 and is also connected to the direct voltage source V at terminal 2 through load resistor R. The cathode terminal 4 is connected to the fourth or N2 region of the thyristor and is grounded. The third or P2 layer is connected to the gate terminal 5 and the second or N1 layer is connected to the anode gate terminal 6. The intervening junctions J1, J2 and J3 exist between the layers in the same order previously described in FIG. 2. The circuit otherwise is identical to FIG. 2 except for the addition of the third diode D3 which is connected between the cathode terminal 4 and the anode gate terminal 6. The addition of this third diode has been found to significantly improve both the *dv/dt* capability as well as the forward blocking recovery time capability of the thyristor.

The operation of the circuit of FIG. 3 may be best understood by following through a cycle of operation. When a trigger pulse is applied to trigger terminal 1 the thyristor turns on and the first half cycle of ringing current from the resonant turn-off circuit, L, C, flows through the thyristor in the same manner previously described for FIGS. 1 and 2. The sequence of operations during the second half cycle of ringing current, however, differs from that previously described and results in a more rapid turn-off and recovery than can be achieved by either of the prior art circuits. The reverse ringing current first flows through all three junctions of the thyristor until junction J3 starts to recover. Current is then diverted through diode D3 and junction J1. It is of particular advantage that diode D3 provides the recovery current for junction J1 without requiring current to flow through junction J2 because this reduces the amount of charge accumulated in junction J2 that will have to be removed before this junction can recover. As junction J1 recovers, the reverse turn-off current is now caused to flow in the reverse direction through junction J2 by way of diode D3, junction J2 and diode D2, thereby forcing a rapid recovery of the middle junction J2. As junction J2 begins to recover, the rest of the reverse current from the turn-off circuit is diverted through diodes D1 and D2. A short time later the ringing current starts its third half cycle and adds current to that supplied from the direct voltage source. This combined current momentarily flows through diodes D1 and D2 but since diode D2 recovers rapidly it promptly opens leaving diode D1 to complete its recovery by recombination. The fact that diode D1 recovers slowly prevents any displacement current from falsely recycling the switch. The sequence of operations just described not only permits removal of the stored charge in junction J1 without requiring current to flow through junction J2, but it also permits forcing a reverse current through junction J2 to appreciably speed its recovery over that attainable by the recombination process alone. This permits the reapplication of the supply voltage to the switch at a very much higher rate without causing false firing and this effect is considerably enhanced by the fact that diodes D2 and D3 recover more rapidly than does junction J2 while diode D1 recovers more slowly.

Experimental results showing the advantage of this invention is evident from the data in Table I which was obtained by using a commercially available GE3N85 thyristor. The table shows no recovery time data for tests made with the circuits of FIGS. 1 and 2 where the voltage was applied at the rate of 2000 volts per microsecond because this rate exceeded the *dv/dt* capability of this device. It will be noted that the recovery time for the circuit of FIG. 3 was less than that for either of the other two circuits and remained nearly uniform regardless of the rate at which the voltage was applied.

TABLE I

| dv/dt (volts/μsec.) | Fig. 1, recovery | Fig. 2, time | Fig. 3 (μ-seconds) |
|---|---|---|---|
| 200 | 2.8 | 2.2 | 1.4 |
| 500 | 3.5 | 2.8 | 1.15 |
| 1,000 | 4.0 | 3.2 | 1.6 |
| 2,000 | | | 1.4 |

Tests with an experimental thyristor showed a recovery time of 45 microseconds at a voltage application rate of 200 volts per microsecond and a *dv/dt* capability below 500 volts per microsecond when tested in the circuit of FIG. 1. This same thyristor had a recovery time of 4.5 microseconds when tested in the circuit of FIG. 2 at a voltage application rate of 200 volts per microsecond. When tested in the circuit of this invention the recovery time of this same thyristor was reduced to about 2.5 microseconds and held to approximately this value for voltage rates as high as 3000 volts per microsecond. Still another experimental thyristor, the WE27A, tested in the circuits of this invention had a recovery time no greater than 0.75 microsecond for voltage rates as high as 4000 volts per microsecond. These data show definite improvement in both the dynamic breakdown and the recovery time capabilities provided by this invention.

Figure 4:
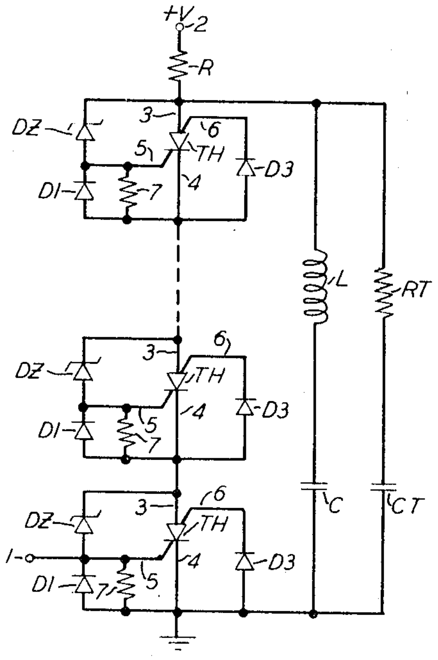
FIG. 4 is an embodiment of the invention in a high voltage series string.

The embodiment of the invention shown in FIG. 3 may be extended to a high voltage series string of the type shown in FIG. 4. It will be evident that the circuit comprising the thyristor and the three diodes of FIG. 3 forms a single unit or stage in FIG. 4 and that a plurality of these stages are connected in series. As in the case of FIG. 3, the lower stage is rendered conductive by applying a trigger pulse to trigger terminal 1. In a long series string it is generally necessary to fire more than one such stage. In either event, the entire string is turned on by substantially simultaneously firing one or more stages, the number to be fired depending upon the length of the string. In the exemplary embodiment shown in FIG. 4, it is assumed that the entire string may be turned on by firing only the lower stage.

A simple, fast recovery diode such as diode D2 in FIG. 3 cannot be successfully used in a series string so it is necessary that this diode be replaced with one of the Zener type but also having a fast reverse recovery time. These are designated as diodes DZ in FIG. 4. The voltage V applied to terminal 2 must be less than the sum of the breakdown voltages of the Zener diodes. When one or more of the stages at the grounded end are fired by the trigger pulse, the sum of the reverse breakdown voltages of the remaining Zener diodes must become less than the supply voltage to cause all of the remaining Zener diodes to break down. This mode of operation can be better understood by assuming that the lower stage in FIG. 4 has just been fired in the manner previously described for FIG. 3. It is, of course, assumed that the supply voltage now exceeds the sum of the reverse breakdown voltages of the remaining Zener diodes so that current now flows through the series circuit from terminal 2, resistor R, through the several Zener diodes and their associated resistors 7 and the bottom thyristor TH to ground. The voltage drop across resistor 7 in each stage turns on its associated thyristor thereby rendering the entire string conductive. This begins the ringing cycle of the turn-off circuit which causes each stage to turn off by the same process previously described for FIG. 3.

It will be noted that resistor RT and capacitor CT have been connected in series with the entire series string. The purpose of this capacitor and resistor is to assist in turning on the string after the triggering pulse has been applied. Before the application of the trigger pulse capacitor CT has been charged to substantially the supply voltage. After the triggering pulse is applied, current from capacitor CT adds to the current from the direct voltage source to speed up the firing of the remaining stages in the string.

Figure 5:
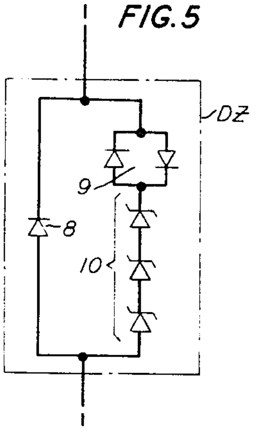
FIG. 5 shows a circuit of semiconductor devices which simulate the fast recovery Zener diode shown in the circuit of FIG. 4.

At the present time there is no Zener diode capable of a sufficiently fast reverse recovery time comparable to that of the simple diode D2 of FIG. 3. However, this can be simulated by the diode network shown in FIG. 5. In this figure, a plurality of Zener diodes 10 are connected in series, the number required depending upon the voltage rating per stage. In series with these Zener diodes is a varistor network 9 comprising a pair of parallel connected, oppositely disposed diodes. This entire series combination is shunted by a fast recovery diode 8. The function of the varistor network 9 is to provide an additional forward voltage drop in series with those of the Zener diodes so that the fast recovery diode 8 will be certain to conduct all of the current in the forward direction. As previously indicated, this entire network shown in FIG. 5 is equivalent to one of the Zener diodes DZ of the string shown in FIG. 4.

While this invention has been illustrated using specific embodiments of the invention, it will be evident to those skilled in this art that various modifications thereof may be made without departing from the scope of the invention.

What is claimed is:

1. A switch circuit comprising at least one thyristor having four layers forming three junctions between said layers, the middle junction existing between said second and third layers having an inherent reverse recovery time, an anode terminal connected to the first layer, an anode gate terminal connected to the second layer, a gate terminal connected to the third layer, a cathode terminal connected to the fourth layer, a turn-off circuit connected in series with said anode and cathode terminals capable of driving a reverse current from said cathode terminal to said anode terminal, a first diode connected between said cathode and gate terminals, a second diode connected between said gate and anode terminals, and a third diode connected between said cathode and anode gate terminals, the reverse recovery time of said middle junction being less than that of said first diode and greater than that of said second and third diodes.

2. The combination of claim 1 wherein said thyristors are connected in series and each of said second diodes is of the Zener type.

3. The combination of claim 1 wherein said turn-off circuit comprises an inductor connected in series with a capacitor.

4. The combination of claim 1 and a resistor and capacitor connected in series with said anode and cathode terminals to assist in triggering the switch circuit.

5. The combination of claim 1 and a load impedance and a source of direct voltage connected in series with said anode and cathode terminals.

6. A switch circuit comprising at least one thyristor having four successive, contiguous layers, each layer having an accessible terminal for connection to external circuits, the second and third of said four layers joined in a junction having an inherent reverse recovery time, a turn-off circuit connected in series with the terminals of the first and fourth of said layers capable of driving a reverse current therethrough, a first diode connected between the terminals of the third and fourth layers, a second diode connected between the terminals of the first and third layers, and a third diode connected between the terminals of the second and fourth layers, the inherent reverse recovery time of said junction being less than that of said first diode and greater than that of said second and third diodes.

7. The combination of claim 6 wherein said thyristors are connected in series and each of said second diodes is of the Zener type.

8. The combination of claim 6 wherein said turn-off circuit comprises an inductor connected in series with a capacitor.

9. The combination of claim 6 and a resistor and capacitor connected in series with the terminals of said first and fourth layers to assist in triggering the switch circuit.

10. The combination of claim 6 and a load impedance and a source of direct voltage connected in series with said first and fourth layers.

11. A switch circuit comprising at least one four-layer thyristor having an anode terminal, an anode gate terminal, a gate terminal and a cathode terminal, the layers connected to said gate terminal and said anode gate terminal forming between them a junction having an inherent reverse recovery time, a turn-off circuit connected in series with said anode terminal and said cathode terminal capable of driving a reverse current through said thyristor from said cathode terminal to said anode terminal, a first diode connected between said cathode terminal and said gate terminal, a second diode connected between said gate terminal and said anode terminal, a third diode connected between said cathode terminal and said anode gate terminal, the reverse recovery time of said junction being less than that of said first diode and greater than that of said second and third diodes.

12. The combination of claim 11 wherein said thyristors are connected in series and each of said second diodes is of the Zener type.

13. The combination of claim 11 wherein said turn-off circuit comprises an inductor connected in series with a capacitor.

14. The combination of claim 11 and a resistor and a capacitor connected in series with said anode terminal and said cathode terminal to assist in triggering said switch circuit.

15. The combination of claim 11 and a load impedance and a source of direct voltage connected in series with said anode terminal and said cathode terminal.

References Cited

UNITED STATES PATENTS 3,404,293 10/1968 Harris et al. -------- 307—305

ARTHUR GAUSS, *Primary Examiner.*

J. D. FREW, *Assistant Examiner.*

U.S. Cl. X.R.

307—252